United States Patent
Li et al.

(10) Patent No.: US 12,432,016 B2
(45) Date of Patent: Sep. 30, 2025

(54) METHODS AND DEVICES FOR CONFIGURING HARQ-ACK FEEDBACK

(71) Applicant: ZTE Corporation, Shenzhen (CN)

(72) Inventors: Xincai Li, Shenzhen (CN); Li Tian, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 398 days.

(21) Appl. No.: 17/979,420

(22) Filed: Nov. 2, 2022

(65) Prior Publication Data
US 2023/0057476 A1    Feb. 23, 2023

Related U.S. Application Data

(63) Continuation of application No. PCT/CN2020/099811, filed on Jul. 2, 2020.

(51) Int. Cl.
| | |
|---|---|
| *H04L 1/18* | (2023.01) |
| *H04L 1/1812* | (2023.01) |
| *H04L 1/1829* | (2023.01) |
| *H04L 5/00* | (2006.01) |
| *H04W 72/23* | (2023.01) |

(52) U.S. Cl.
CPC .......... *H04L 1/1861* (2013.01); *H04L 1/1812* (2013.01); *H04L 5/0055* (2013.01); *H04W 72/23* (2023.01)

(58) Field of Classification Search
CPC ............................ H04L 5/0055; H04W 72/042
See application file for complete search history.

(56) References Cited

U.S. PATENT DOCUMENTS

| | | | |
|---|---|---|---|
| 11,496,247 B2 * | 11/2022 | Liu | H04L 1/1861 |
| 2016/0192388 A1 * | 6/2016 | Ekpenyong | H04L 5/0092 370/329 |
| 2016/0219595 A1 * | 7/2016 | Larsson | H04L 5/0037 |

(Continued)

FOREIGN PATENT DOCUMENTS

| | | |
|---|---|---|
| CN | 107409386 A | 11/2017 |
| CN | 108292974 A | 7/2018 |

(Continued)

OTHER PUBLICATIONS

Office Action issued in Chinese Patent Application No. CN110034902A dated Apr. 3, 2025, w/English translation, 43 pages.

(Continued)

*Primary Examiner* — Zhiren Qin
(74) *Attorney, Agent, or Firm* — Crowell & Moring LLP

(57) ABSTRACT

The present disclosure describes methods, system, and devices for configuring hybrid automatic repeat request acknowledgement (HARQ-ACK) feedback for physical downlink shared channel (PDSCH) transmission. The method includes receiving, by a user equipment (UE), a radio resource control (RRC) parameter to configure a one-shot HARQ-ACK feedback mode; receiving, by the UE, a medium access control (MAC) control element (CE) indicating a list of activated serving cells; receiving, by the UE, a downlink control information (DCI) comprising an one-shot request field with a positive value, the DCI triggering a one-shot HARQ-ACK codebook; and transmitting, by the UE, a one-shot HARQ-ACK feedback for the list of activated serving cells.

17 Claims, 11 Drawing Sheets

(56) References Cited

U.S. PATENT DOCUMENTS

| | | | |
|---|---|---|---|
| 2020/0067656 A1 | 2/2020 | Lyu et al. | |
| 2021/0168776 A1* | 6/2021 | Li | H04W 74/0808 |
| 2021/0242977 A1* | 8/2021 | Khoshnevisan | H04W 76/11 |
| 2022/0311559 A1* | 9/2022 | Wu | H04L 1/1854 |
| 2022/0338219 A1* | 10/2022 | Ding | H04W 72/23 |
| 2022/0385411 A1* | 12/2022 | Lei | H04L 1/1614 |

FOREIGN PATENT DOCUMENTS

| | | |
|---|---|---|
| CN | 109152004 A | 1/2019 |
| CN | 110034902 A | 7/2019 |
| CN | 110708146 A | 1/2020 |
| CN | 111130735 A | 5/2020 |

OTHER PUBLICATIONS

Extended European Search Report regarding EP 20 94 3322 dated May 11, 2023, 9 pages.

Huawei, "Feature lead summary#2 of HARQ enhancements for NR-U," 3GPP Draft; Rl-1911618, FL Summary#2 for72223 NRU HARQ RAN1_98B, 3rd Generation Partnership Project (3GPP), Mobile Competence Centre, Sophia-Antipolis, France, vol. RAN WGI, no. Chongqing, China, Oct. 22, 2019, Retrieved from the Internet: ftp.3gpp.org/tsg_ran/WG1_RL1/TSGR1_98b/Docs/Rl-1911618.2ip Rl-1911618 FLsummary#2 for 72223NRUHARQ RAN1_98b.docx.

OPPO, "HARQ enhancements for NR-U," 3GPP Draft, Rl-1912508, 3rd Generation Partnership Project (3GPP), Mobile Competence Centre; 650, Route Des Lucioles; F-06921 Sophia-Antipolis Cedex, France, vol. RAN WGI, no. Reno, USA; Nov. 18, 2019-Nov. 22, 2019, Nov. 9, 2019, Retrieved from the Internet: URL:https://ftp.3gpp.org/tsg_ran/WG1_RL1/TSGR1_99/Docs/Rl1912508.zipRl-1912508.docx.

International Search Report and Written Opinion regarding PCT/CN2020/099811 dated Mar. 26, 2021, 7 pages.

Hua Wei, "TP forNR-U HARQ issue BIO," 3GPP TSG RAN WGI Meeting #I00bis Rl-2003029, Apr. 30, 2020.

OPPO, "Discussion on the remaining issues of HARQ enhancements," 3GPP TSG RAN WGI #I00bis Rl-2001761, Apr. 30, 2020.

Nokia et al., "Remaining issues on NR-U HARQ scheduling and feedback," 3GPP TSG RAN WGI Meeting #101 Rl-2004257, Jun. 5, 2020.

Extended European Search Report EP 24 18 5421 dated Nov. 7, 2024—9 pages.

Office Action issued in Korean Patent Application No. 10-2022-7021319 dated Jun. 18, 2025, w/English translation, 10 pages.

* cited by examiner

500 receiving, by a user equipment (UE), a radio resource control (RRC) parameter to configure a one-shot HARQ-ACK feedback mode;
510 receiving, by the UE, a downlink control information (DCI) comprising an one-shot request field with a positive value, the DCI triggering a one-shot HARQ-ACK codebook;
520 in response at least one HARQ process satisfying a preset condition, transmitting, by the UE, a one-shot HARQ-ACK feedback for the at least one HARQ process
530

FIG. 5

900 receiving, by a user equipment (UE), a radio resource control (RRC) parameter to configure a one-shot HARQ-ACK feedback mode;
910 receiving, by the UE, a downlink control information (DCI) comprising an one-shot request field with a positive value, the DCI triggering a one-shot HARQ-ACK feedback;
920 transmitting, by the UE, a first one-shot HARQ-ACK feedback with a first one-shot HARQ-ACK codebook for at least one non-semi-persistent scheduling (non-SPS) PDSCH and a second one-shot HARQ-ACK feedback with a second one-shot HARQ-ACK codebook for at least one SPS PDSCH
930

FIG. 9

METHODS AND DEVICES FOR CONFIGURING HARQ-ACK FEEDBACK

CROSS-REFERENCE TO RELATED APPLICATION

This application is a continuation application of PCT International Patent Application No. PCT/CN2020/099811, filed with the China National Intellectual Property Administration, PRC on Jul. 2, 2020, which is herein incorporated by reference in its entirety.

TECHNICAL FIELD

The present disclosure is directed generally to wireless communications. Particularly, the present disclosure relates to methods and devices for configuring hybrid automatic repeat request acknowledgement (HARQ-ACK) feedback.

BACKGROUND

Wireless communication technologies are moving the world toward an increasingly connected and networked society. High-speed and low-latency wireless communications rely on efficient network resource management and allocation between user equipment and wireless access network nodes (including but not limited to wireless base stations). A new generation network is expected to provide high speed, low latency and ultra-reliable communication capabilities and fulfil the requirements from different industries and users. Ultra-reliable low-latency communication (URLLC) may provide communication with a high reliability and low latency between a user equipment and wireless access network nodes. URLLC may be supported on a licensed frequency carrier and/or an unlicensed frequency carrier. There are some issues and problems associated with transmitting feedback information, for example, when a user equipment (UE) need to configure hybrid automatic repeat request acknowledgement (HARQ-ACK) feedback, how to improve the performance of transmitting feedback information; for another example, the HARQ-ACK codebook may contains HARQ-ACK information for many configured HARQ processes so that the HARQ-ACK codebook may be large and impact the performance. The present disclosure may address at least some of issues associated with the existing system to improve the performance of the wireless communication.

SUMMARY

This document relates to methods, systems, and devices for wireless communication, and more specifically, for configuring hybrid automatic repeat request acknowledgement (HARQ-ACK) feedback.

In one embodiment, the present disclosure describes a method for wireless communication. The method includes configuring hybrid automatic repeat request acknowledgement (HARQ-ACK) feedback for physical downlink shared channel (PDSCH) transmission by: receiving, by a user equipment (UE), a radio resource control (RRC) parameter to configure a one-shot HARQ-ACK feedback mode; receiving, by the UE, a medium access control (MAC) control element (CE) indicating a list of activated serving cells; receiving, by the UE, a downlink control information (DCI) comprising an one-shot request field with a positive value, the DCI triggering a one-shot HARQ-ACK codebook; and transmitting, by the UE, a one-shot HARQ-ACK feedback for the list of activated serving cells.

In another embodiment, the present disclosure describes a method for wireless communication. The method includes configuring hybrid automatic repeat request acknowledgement (HARQ-ACK) feedback for physical downlink shared channel (PDSCH) transmission by: receiving, by a user equipment (UE), a radio resource control (RRC) parameter to configure a one-shot HARQ-ACK feedback mode; receiving, by the UE, a downlink control information (DCI) comprising an one-shot request field with a positive value, the DCI triggering a one-shot HARQ-ACK codebook; and in response at least one HARQ process satisfying a preset condition, transmitting, by the UE, a one-shot HARQ-ACK feedback for the at least one HARQ process.

In another embodiment, the present disclosure describes a method for wireless communication. The method includes configuring hybrid automatic repeat request acknowledgement (HARQ-ACK) feedback for physical downlink shared channel (PDSCH) transmission by: receiving, by a user equipment (UE), a radio resource control (RRC) parameter to configure a one-shot HARQ-ACK feedback mode; receiving, by the UE, a downlink control information (DCI) comprising an one-shot request field with a positive value, the DCI triggering a one-shot HARQ-ACK feedback; and transmitting, by the UE, a first one-shot HARQ-ACK feedback with a first one-shot HARQ-ACK codebook for at least one non-semi-persistent scheduling (non-SPS) PDSCH and a second one-shot HARQ-ACK feedback with a second one-shot HARQ-ACK codebook for at least one SPS PDSCH.

In some other embodiments, an apparatus for wireless communication may include a memory storing instructions and a processing circuitry in communication with the memory. When the processing circuitry executes the instructions, the processing circuitry is configured to carry out the above methods.

In some other embodiments, a device for wireless communication may include a memory storing instructions and a processing circuitry in communication with the memory. When the processing circuitry executes the instructions, the processing circuitry is configured to carry out the above methods.

In some other embodiments, a computer-readable medium comprising instructions which, when executed by a computer, cause the computer to carry out the above methods.

The above and other aspects and their implementations are described in greater detail in the drawings, the descriptions, and the claims.

BRIEF DESCRIPTION OF THE DRAWINGS

FIG. 5 shows a flow diagram of a method for wireless communication.

FIG. 9 shows a flow diagram of a method for wireless communication.

DETAILED DESCRIPTION

Figure 1A:
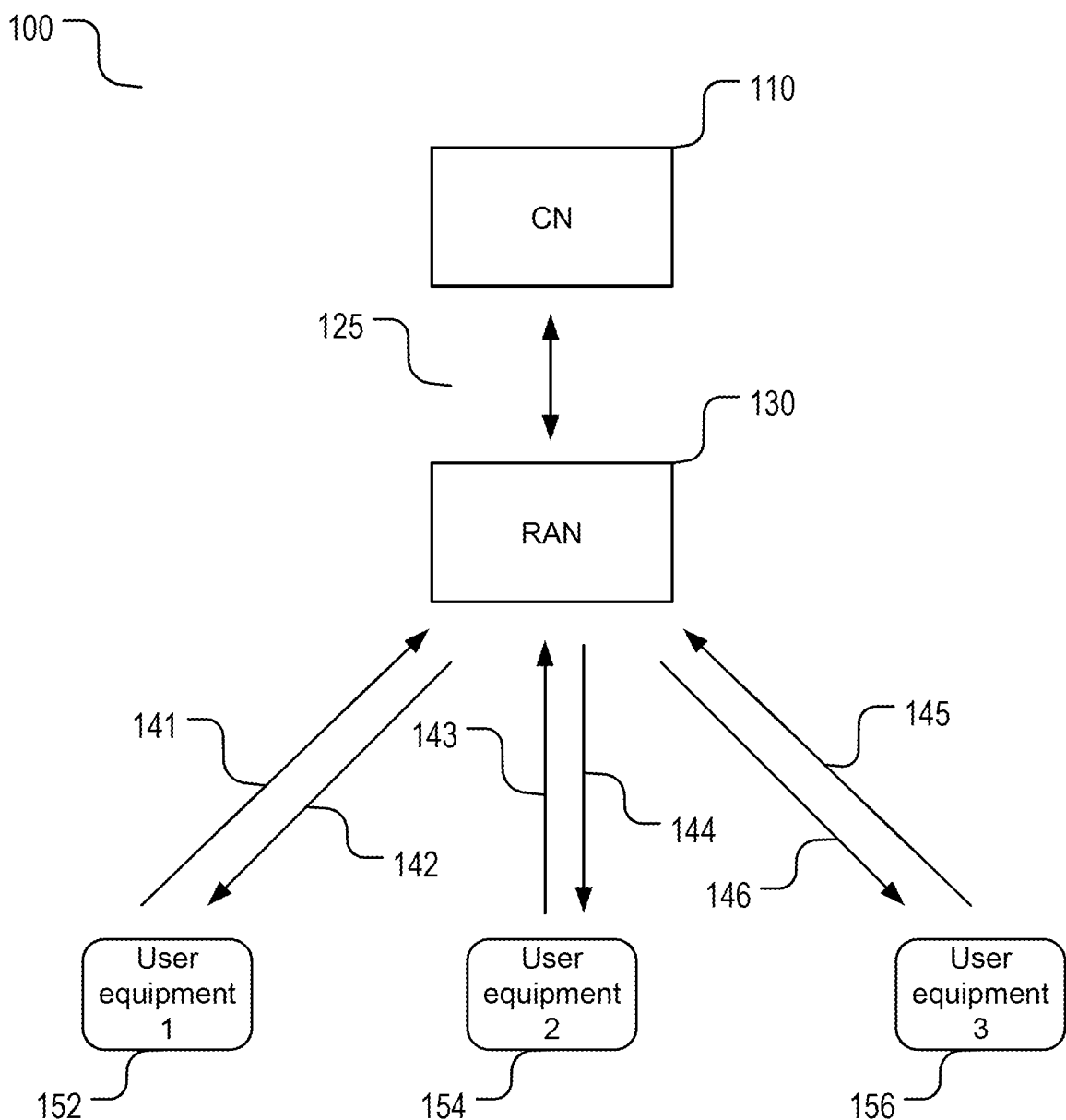
FIG. 1A shows an example of a wireless communication system.

The present disclosure will now be described in detail hereinafter with reference to the accompanied drawings, which form a part of the present disclosure, and which show, by way of illustration, specific examples of embodiments. Please note that the present disclosure may, however, be embodied in a variety of different forms and, therefore, the covered or claimed subject matter is intended to be construed as not being limited to any of the embodiments to be set forth below.

Throughout the specification and claims, terms may have nuanced meanings suggested or implied in context beyond an explicitly stated meaning. Likewise, the phrase "in one embodiment" or "in some embodiments" as used herein does not necessarily refer to the same embodiment and the phrase "in another embodiment" or "in other embodiments" as used herein does not necessarily refer to a different embodiment. The phrase "in one implementation" or "in some implementations" as used herein does not necessarily refer to the same implementation and the phrase "in another implementation" or "in other implementations" as used herein does not necessarily refer to a different implementation. It is intended, for example, that claimed subject matter includes combinations of exemplary embodiments or implementations in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B, or C, is intended to mean A, B, and C, here used in the inclusive sense, as well as A, B or C, here used in the exclusive sense. In addition, the term "one or more" or "at least one" as used herein, depending at least in part upon context, may be used to describe any feature, structure, or characteristic in a singular sense or may be used to describe combinations of features, structures or characteristics in a plural sense. Similarly, terms, such as "a", "an", or "the", again, may be understood to convey a singular usage or to convey a plural usage, depending at least in part upon context. In addition, the term "based on" or "determined by" may be understood as not necessarily intended to convey an exclusive set of factors and may, instead, allow for existence of additional factors not necessarily expressly described, again, depending at least in part on context.

The present disclosure describes methods and devices for configuring hybrid automatic repeat request acknowledgement (HARQ-ACK) feedback.

New Radio (NR), or 5th generation (5G), wireless communication may provide a range of capabilities from downloading with fast speeds to support real-time low-latency communication. New Radio (NR) mobile communication system are moving the world toward an increasingly connected and networked society. High-speed and low-latency wireless communications rely on efficient network resource management and allocation between user equipment and wireless access network nodes (including but not limited to wireless base stations). A new generation network is expected to provide high speed, low latency and ultra-reliable communication capabilities and fulfil the requirements from different industries and users. Ultra-reliable low-latency communication (URLLC) may provide communication with a high reliability and low latency between a user equipment and wireless access network nodes. To increase bandwidth, shorten latency, and/or improve speed, the wireless communication may be carried on licensed frequency bands and/or new radio unlicensed (NR-U) frequency bands.

In the 5th generation (5G) communication system on licensed frequency carriers, a URLLC service may configure one or more sub-slots within one slot. Each of the one or more sub-slots may be configured to transmit the feedback information, so as to lower the latency in the URLLC service on licensed carriers. In the 5th generation (5G) communication system on NR-U frequency carriers, problems exist so as to increase time needed for transmitting feedback information, thus increasing latency and worsening the performance of the communication system on NR-U frequency carriers.

The present disclosure describes various embodiments addressing some of the problems discussed above.

FIG. 1A shows a wireless communication system 100 including a core network (CN) 110, a radio access network (RAN) 130, and one or more user equipment (UE) (152, 154, and 156). The RAN 130 may include a wireless network base station, or a NG radio access network (NG-RAN) base station or node, which may include a nodeB (NB, e.g., a gNB) in a mobile telecommunications context. In one implementation, the core network 110 may include a 5G core network (5GC), and the interface 125 may include a new generation (NG) interface.

Referring to FIG. 1A, a first UE 152 may wirelessly receive downlink communication 142 from the RAN 130 and wirelessly send uplink communication 141 to the RAN 130. Likewise, a second UE 154 may wirelessly receive downlink communication 144 from the RAN 130 and wirelessly send uplink communication 143 to the RAN 130; and a third UE 156 may wirelessly receive downlink communication 146 from the RAN 130 and wirelessly send uplink communication 145 to the RAN 130. For example but not limited to, a downlink communication may include a physical downlink shared channel (PDSCH) or a physical downlink control channel (PDCCH), and a uplink communication may include a physical uplink shared channel (PUSCH) or a physical uplink control channel (PUCCH). The downlink communication (142, 144, and/or 146) and/or uplink communication (141, 143, and/or 145) may be transmitted on licensed frequency carriers or NR-U frequency carriers.

When URLLC operates on licensed carriers, UE may be configured with more than one HARQ-ACK codebooks by at least one radio resource control (RRC) parameter, for example but not limited to, pdsch-HARQ-ACK-Codebook-List-r16 and UCI-OnPUSCH-List-r16. When two HARQ-ACK codebooks are configured, the parameters for these HARQ-ACK codebooks, such as candidate k1 set, the PUCCH resource set and UCI-OnPUSCH may be separately configured. The transmission of the two HARQ-ACK codebooks may be dependently in different PUCCH/PUSCH. When the transmission of these two codebooks occurs at the same slot, the HARQ-ACK codebook for lower priority (e.g., Priority index=0) may be dropped.

Using unlicensed carriers to transmit data may increase the utilization rate of available transmission resources, thus improving URLLC performance. There are some challenges associated with operating URLLC on unlicensed carriers. In low-latency wireless communications on the unlicensed carriers, a transmitted wireless message may be lost or corrupted and uncorrectable due to channel quality imperfection and fluctuation in the communication resources. As channel access should be performed before data transmission, for example, a device needs to perform a clear channel assessment (CCA) and have a successful result prior to data transmission. In some countries and regions, there are regulatory policies for the use of unlicensed spectrum. A device may perform a listening before talk (LBT) procedure (e.g., CCA) before sending data via an unlicensed carrier. For example, according to a channel access procedure, only devices with successful CCA may send data on the unlicensed carrier.

Another problem may occur when URLLC operates in unlicensed carriers. When channel access failure occurs, the gNB/UE may not send data and the receiver may not receive the data correctly. These messages, which are not received correctly, may need to be retransmitted again, thus worsening the latency and reliability. Therefore, proper designs of control mechanisms for detection and retransmission of the lost or corrupted messages may help improve the efficiency of the wireless access network, particular for accessing unlicensed shared radio frequency bands. To improve efficiency of data transmission, channel access procedure and control signaling need to be considered, and a communication system may support fast and reliability data transmission such as using unlicensed carriers for transmitting URLLC uplink HARQ-ACK feedback.

For URLLC NR R16 operation in licensed band operation, UE may be configured with more than one HARQ-ACK-Codebook by RRC parameter pdsch-HARQ-ACK-Codebook-List-r16 or UCI-OnPUSCH-List-r16. When the UE is configured with two HARQ-ACK-Codebook, the parameters for these HARQ-ACK-Codebook, such as candidate k1 set, the PUCCH resource set and UCI-OnPUSCH may be separately configured. In one implementation, the two HARQ-ACK-Codebook transmission may be dependent in different PUCCH/PUSCH. In another implementation, when the transmission of these two codebook at the same slot, the HARQ-ACK-Codebook for priority index (PI)=0 may be dropped.

To improve efficiency of data transmission, channel access procedure and control signaling may be considered. The communication system may support fast and reliability data transmission such as using unlicensed carriers for transmitting URLLC uplink HARQ-ACK feedback.

For NRU in R16, a type-3 HARQ-ACK codebook may be named as one-shot HARQ-ACK feedback scheme, which may be introduced for providing multiple transmission opportunity for ACK/NACK feedback. When a UE is configured as one-shot feedback scheme (i.e., the one-shot feedback scheme is enabled) and the one-shot request bit filed in a DCI is 1, the UE may feedback of a HARQ-ACK codebook containing all downlink (DL) HARQ processes (one-shot feedback) for all serving/carrier cells (CCs) configured for the UE in the PUCCH group in the PUCCH/PUSCH. This may result in a very large HARQ-ACK codebook and may impact the performance. This present disclosure describes various embodiments including methods to reduce the codebook size, leading to a smaller HARQ-ACK payload and high reliability of the same resources.

For DCI format 1_1, radio resource control (RRC) parameters for one-shot HARQ-ACK feedback such as pdsch-HARQ-ACK-OneShotFeedbackCBG-r16 and pdsch-HARQ-ACK-OneShotFeedbackNDI-r16 may be configured in the PhysicalCellGroupConfig information element (IE). The maximum number of serving cell configured to a UE may be 32, which is configured by maxNrofServingCells parameter. With a default process number of 8, the other supported HARQ process numbers may include {2, 4, 6, 10, 12, 16}, which may be configured for is for each serving cell. The size of the one-shot codebook may be very large and the reliability may be negatively impacted.

Figure 1B:
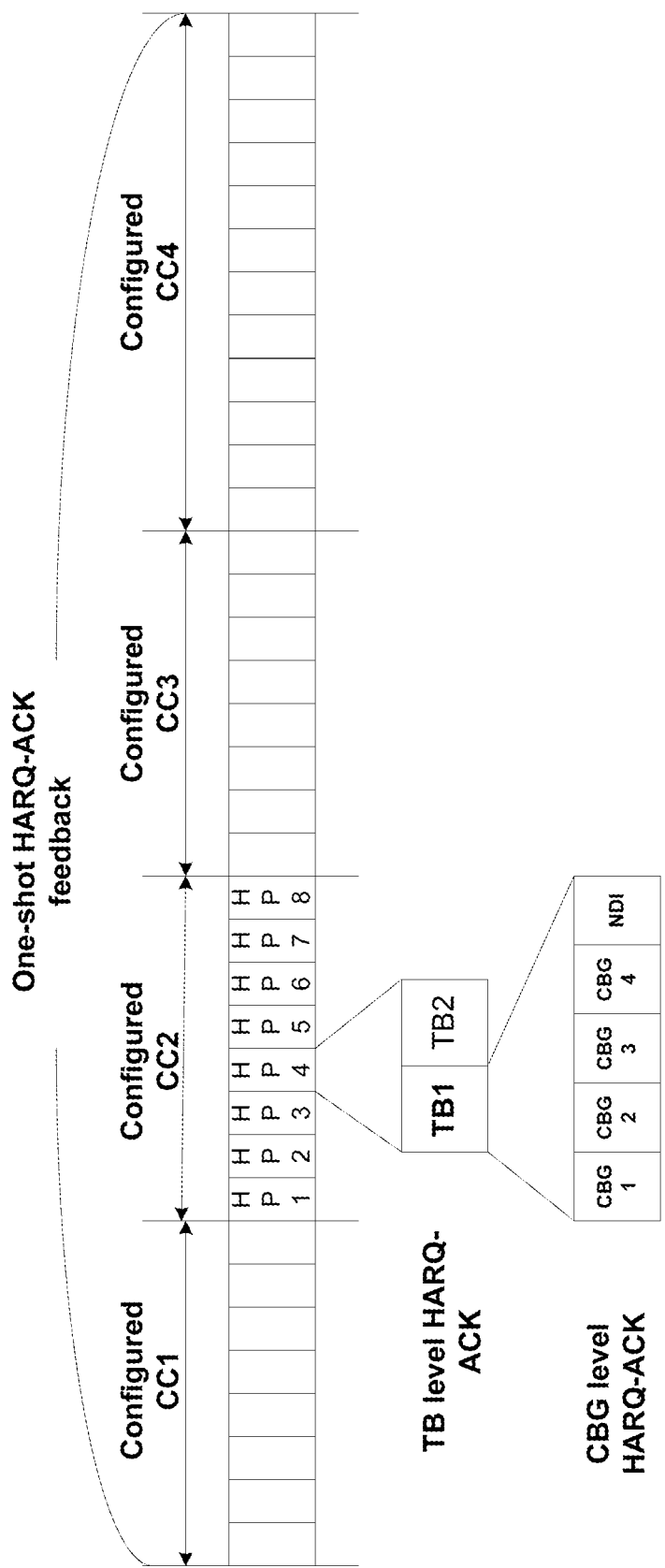
FIG. 1B shows a schematic diagram of a method for wireless communication.

Referring to FIG. 1B, an example for one-shot HARQ-ACK codebook may include 4 serving cells (CC1, CC2, CC3, and CC4). 8 HARQ processes are configured for the first three serving cells (CC11, CC2, and CC3), and 12 HARQ processes are configured for the fourth serving cell (CC4). In one implementation, 2 codewords may be transmitted on one PDSCH by configuration maxNrofCodeWordsScheduledByDCI=2. Besides, if pdsch-HARQ-ACK-OneShotFeedbackCBG-r16 and pdsch-HARQ-ACK-OneShotFeedbackNDI-r16.configured to UE, CBG level HARQ-ACK and NDI are also included in the one-shot HARQ-ACK codebook.

The HARQ-ACK codebook (for example, in FIG. 1B) may be very large and may impact the performance. This present disclosure describes various embodiments including methods to reduce the codebook size, leading to a smaller HARQ-ACK payload and high reliability of the same resources.

Figure 2:
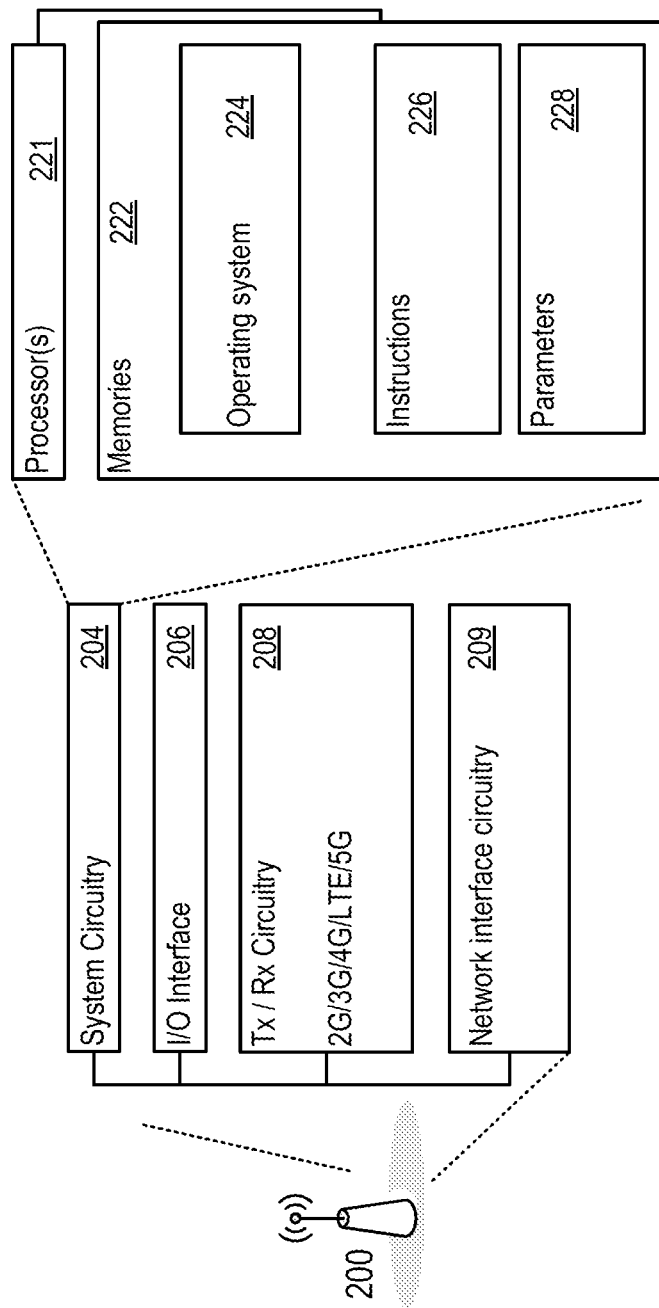
FIG. 2 shows an example of a wireless network node.

FIG. 2 shows an exemplary a radio access network or a wireless communication base station 200. The base station 200 may include radio transmitting/receiving (Tx/Rx) circuitry 208 to transmit/receive communication with one or more UEs, and/or one or more other base stations. The base station may also include network interface circuitry 209 to communicate the base station with other base stations and/or a core network, e.g., optical or wireline interconnects, Ethernet, and/or other data transmission mediums/protocols. The base station 200 may optionally include an input/output (I/O) interface 206 to communicate with an operator or the like.

The base station may also include system circuitry 204. System circuitry 204 may include processor(s) 221 and/or memory 222. Memory 222 may include an operating system 224, instructions 226, and parameters 228. Instructions 226 may be configured for the one or more of the processors 124 to perform the functions of the base station. The parameters 228 may include parameters to support execution of the instructions 226. For example, parameters may include network protocol settings, bandwidth parameters, radio frequency mapping assignments, and/or other parameters.

Figure 3:
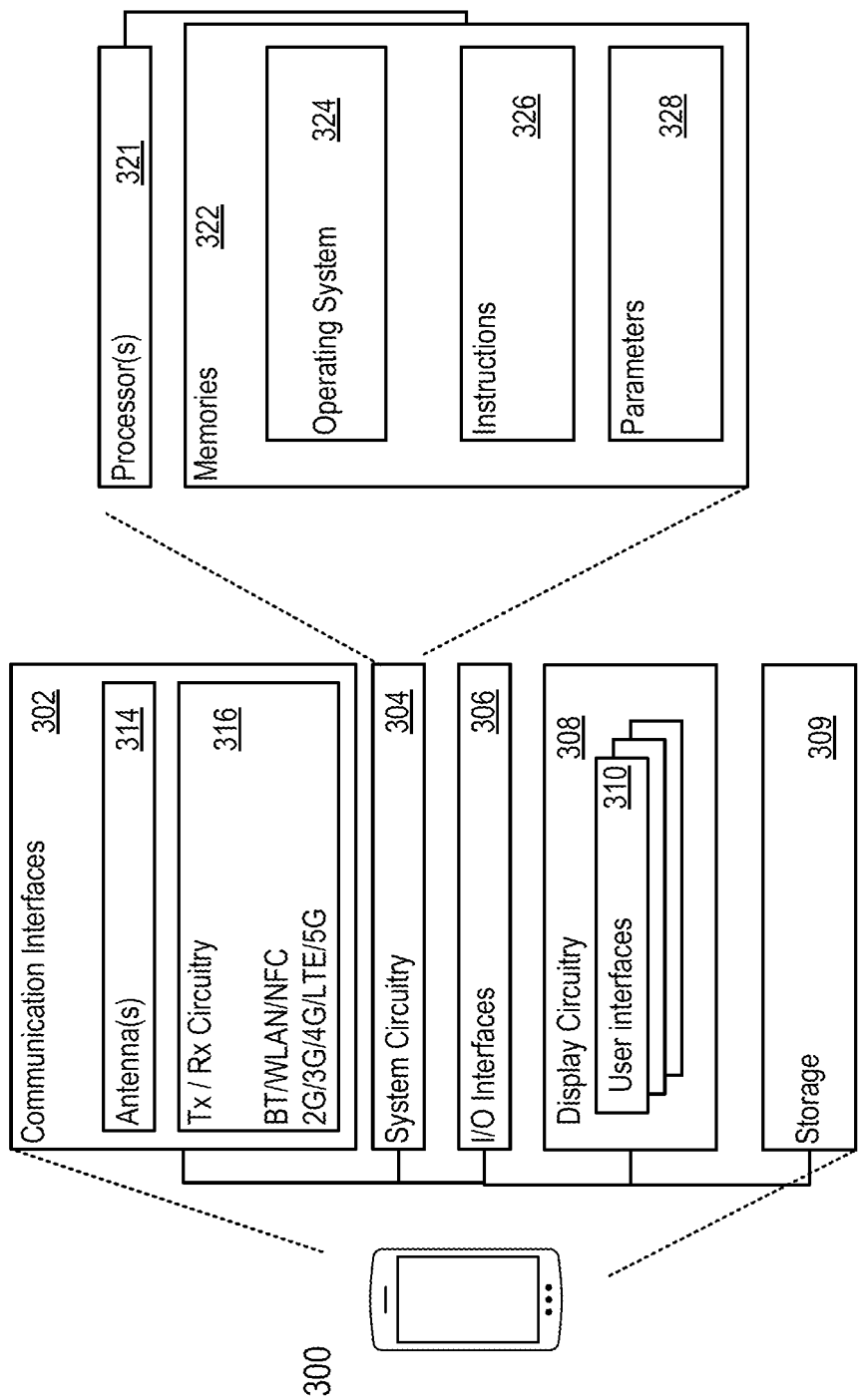
FIG. 3 shows an example of a user equipment.

FIG. 3 shows an exemplary user equipment (UE) 300. The UE 300 may be a mobile device, for example, a smart phone or a mobile communication module disposed in a vehicle. The UE 300 may include communication interfaces 302, a system circuitry 304, an input/output interfaces (I/O) 306, a display circuitry 308, and a storage 309. The display circuitry may include a user interface 310. The system circuitry 304 may include any combination of hardware, software, firmware, or other logic/circuitry. The system circuitry 304 may be implemented, for example, with one or more systems on a chip (SoC), application specific integrated circuits (ASIC), discrete analog and digital circuits, and other circuitry. The system circuitry 304 may be a part of the implementation of any desired functionality in the UE 300. In that regard, the system circuitry 304 may include logic that facilitates, as examples, decoding and playing music and video, e.g., MP3, MP4, MPEG, AVI, FLAC, AC3, or WAV decoding and playback; running applications; accepting user inputs; saving and retrieving application data;

establishing, maintaining, and terminating cellular phone calls or data connections for, as one example, internet connectivity; establishing, maintaining, and terminating wireless network connections, Bluetooth connections, or other connections; and displaying relevant information on the user interface 310. The user interface 310 and the inputs/output (I/O) interfaces 306 may include a graphical user interface, touch sensitive display, haptic feedback or other haptic output, voice or facial recognition inputs, buttons, switches, speakers and other user interface elements. Additional examples of the I/O interfaces 306 may include microphones, video and still image cameras, temperature sensors, vibration sensors, rotation and orientation sensors, headset and microphone input/output jacks, Universal Serial Bus (USB) connectors, memory card slots, radiation sensors (e.g., IR sensors), and other types of inputs.

Referring to FIG. 3, the communication interfaces 302 may include a Radio Frequency (RF) transmit (Tx) and receive (Rx) circuitry 316 which handles transmission and reception of signals through one or more antennas 314. The communication interface 302 may include one or more transceivers. The transceivers may be wireless transceivers that include modulation/demodulation circuitry, digital to analog converters (DACs), shaping tables, analog to digital converters (ADCs), filters, waveform shapers, filters, pre-amplifiers, power amplifiers and/or other logic for transmitting and receiving through one or more antennas, or (for some devices) through a physical (e.g., wireline) medium. The transmitted and received signals may adhere to any of a diverse array of formats, protocols, modulations (e.g., QPSK, 16-QAM, 64-QAM, or 256-QAM), frequency channels, bit rates, and encodings. As one specific example, the communication interfaces 302 may include transceivers that support transmission and reception under the 2G, 3G, BT, WiFi, Universal Mobile Telecommunications System (UMTS), High Speed Packet Access (HSPA)+, 4G/Long Term Evolution (LTE), and 5G standards. The techniques described below, however, are applicable to other wireless communications technologies whether arising from the 3rd Generation Partnership Project (3GPP), GSM Association, 3GPP2, IEEE, or other partnerships or standards bodies.

Referring to FIG. 3, the system circuitry 304 may include one or more processors 321 and memories 322. The memory 322 stores, for example, an operating system 324, instructions 326, and parameters 328. The processor 321 is configured to execute the instructions 326 to carry out desired functionality for the UE 300. The parameters 328 may provide and specify configuration and operating options for the instructions 326. The memory 322 may also store any BT, WiFi, 3G, 4G, 5G or other data that the UE 300 will send, or has received, through the communication interfaces 302. In various implementations, a system power for the UE 300 may be supplied by a power storage device, such as a battery or a transformer.

The present disclosure describes several embodiments of methods and devices for configuring hybrid automatic repeat request acknowledgement (HARQ-ACK) feedback for physical downlink shared channel (PDSCH) transmission, which may be implemented, partly or totally, on the wireless network base station and/or the user equipment described above in FIGS. 2 and 3. The present disclosure may improve the reliability of the one-shot HARQ-ACK codebook for URLLC operation on unlicensed band.

Figure 4:
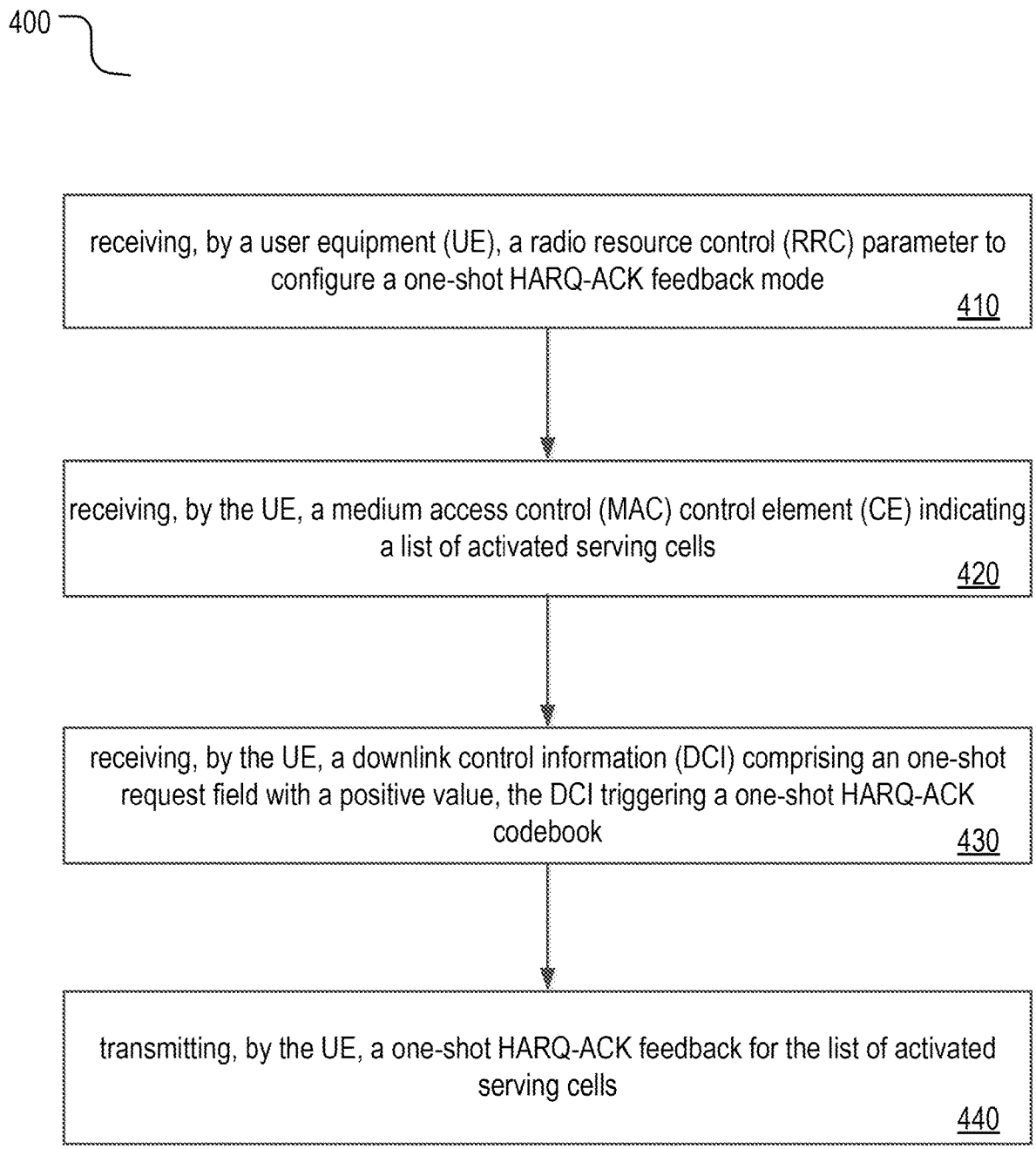
FIG. 4 shows a flow diagram of a method for wireless communication.

In one embodiment, referring to FIG. 4, a method 400 for wireless communication includes configuring hybrid automatic repeat request acknowledgement (HARQ-ACK) feedback for physical downlink shared channel (PDSCH) transmission. The method 400 may include a portion or all of the following: step 410, receiving, by a user equipment (UE), a radio resource control (RRC) parameter to configure a one-shot HARQ-ACK feedback mode; step 420, receiving, by the UE, a medium access control (MAC) control element (CE) indicating a list of activated serving cells; step 430, receiving, by the UE, a downlink control information (DCI) comprising an one-shot request field with a positive value, the DCI triggering a one-shot HARQ-ACK codebook; and step 440, transmitting, by the UE, a one-shot HARQ-ACK feedback for the list of activated serving cells. Optionally, the UE does not transmit HARQ-ACK feedback for non-activated serving cells one-shot HARQ-ACK codebook, wherein the non-activated serving cells are serving cells not in the list of activated serving cells.

In one implementation, the UE may determine the one-shot HARQ-ACK codebook according to the list of the activated serving cells of the MAC CE, the one-shot HARQ-ACK codebook only comprising HARQ-ACK information for the list of activated serving cells.

In another implementation, the one-shot request field with a positive value comprises the one-shot request field with a value of 1; and the RRC parameter indicating the one-shot HARQ-ACK feedback mode comprises a pdsch-HARQ-ACK-Codebook with pdsch-HARQ-ACK-OneShotFeedback-r16 enabled.

For example, a UE may determine the one-shot HARQ-ACK codebook according to the MAC CE for activated serving cell. That is one-shot HARQ-ACK codebook only contain the HARQ-ACK information for activated cell. When a PUCCH group contain 16 cells and only 4 cells are activated through MAC CE, the UE may only report the HARQ-ACK for these 4 activated cell, and the NACK information for other non-activated cells may not be reported. Through this method, the size of the one-shot HARQ-ACK codebook may be reduced heavily and the reliability may be improved.

In various embodiments, referring to FIG. 5, a method 500 for wireless communication includes configuring hybrid automatic repeat request acknowledgement (HARQ-ACK) feedback for physical downlink shared channel (PDSCH) transmission. The method 500 may include a portion or all of the following: step 510, receiving, by a user equipment (UE), a radio resource control (RRC) parameter to configure a one-shot HARQ-ACK feedback mode; step 520, receiving, by the UE, a downlink control information (DCI) comprising an one-shot request field with a positive value, the DCI triggering a one-shot HARQ-ACK codebook; and step 530, in response at least one HARQ process satisfying a preset condition, transmitting, by the UE, a one-shot HARQ-ACK feedback for the at least one HARQ process. In one implementation, the one-shot request field with a positive value comprises the one-shot request field with a value of 1; and/or the RRC parameter indicating the one-shot HARQ-ACK feedback mode comprises a pdsch-HARQ-ACK-Codebook with pdsch-HARQ-ACK-OneShotFeedback-r16 enabled.

In one embodiment, one-shot HARQ-ACK codebook may only contain the HARQ-ACK information that have the same priority as indicated in the DCI triggering one-shot feedback and the HARQ processes that does not have the same priority may pad with NACK information. The DCI comprises a priority index. The priority index may include 0, or 1. In one implementation, when at least one HARQ process has a same priority index as the priority index in the DCI, the UE determines the one-shot HARQ-ACK codebook according to the at least one HARQ process. In another implementation, when at least one HARQ process does not have a same priority index as the priority index in the DCI, the UE pads the one-shot HARQ-ACK codebook with NACK information according to the at least one HARQ process.

In another implementation, the one-shot HARQ-ACK codebook comprises HARQ-ACK information for the at least one HARQ process having the same priority index as the priority index in the DCI, and NACK for other HARQ process having a different priority index as the priority index in the DCI.

Figure 6:
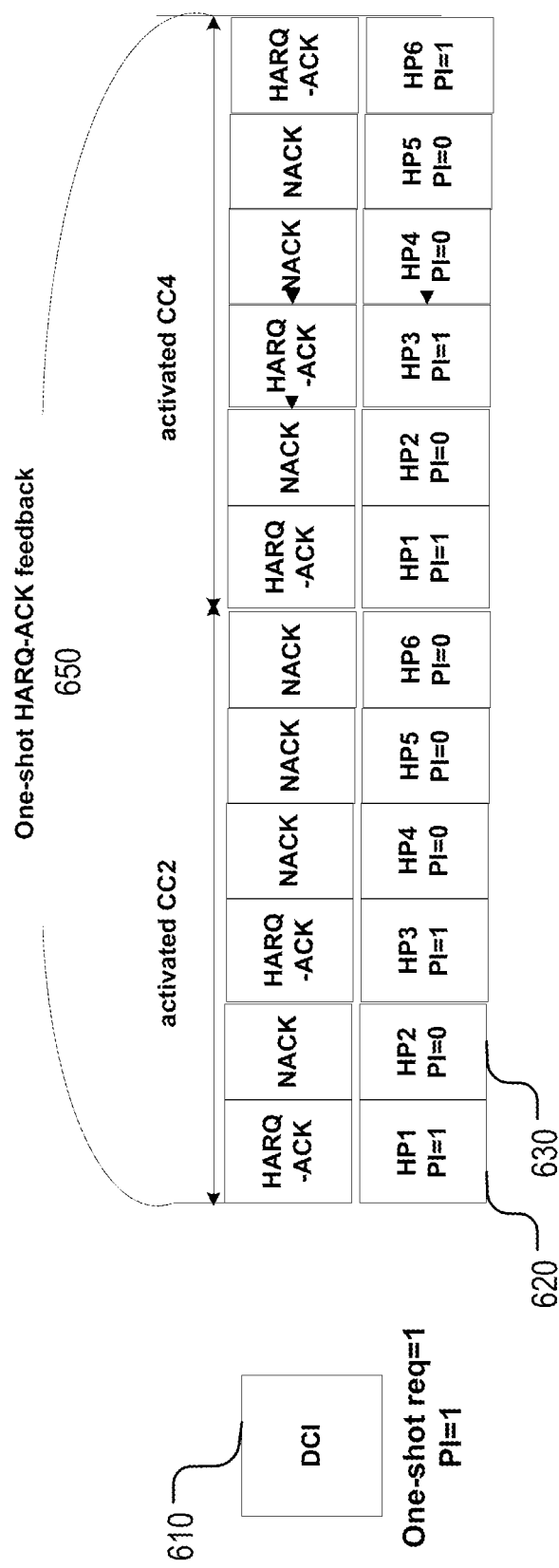
FIG. 6 shows a schematic diagram of a method for wireless communication.

FIG. 6 shows an example for the embodiment. In slot/sub-slot n, a UE receives a PDSCH1 with the priority index 1 for HARQ process 1, and in slot/sub-slot n+1, the UE receive PDSCH2 with the priority index 0 for HARQ process 2, and in slot/sub-slot n+2, UE receive a DCI (610) with one-shot HARQ-ACK request value=1 and the priority index=1, and k1=1. The UE reports the one-shot HARQ-ACK codebook (650) that contains the HARQ-ACK for the HARQ process 1 (620) that has same priority index with the priority index of the DCI (610) triggering one-shot HARQ-ACK codebook. The UE reports NACK for HARQ process 2 (630) that has different priority index with the indication of DCI (610) triggering one-shot HARQ-ACK codebook.

In another embodiment, when a timeline of an offset value of a HARQ process is larger than a predefined value, the HARQ-ACK information of the HARQ process may be dropped from the one-shot HARQ-ACK feedback and the HARQ-ACK of that HARQ process may not be reported. When a timeline of an offset value of a HARQ process is not larger than the predefined value, the HARQ-ACK information of the HARQ process may be included in the one-shot HARQ-ACK feedback and the HARQ-ACK of that HARQ process may be reported.

Each of the at least one HARQ process includes an offset value in timeline. When the offset value in timeline of a HARQ process is no larger than a predefined value, the UE determines a one-shot HARQ-ACK codebook according to the HARQ process; and/or the one-shot HARQ-ACK codebook comprises HARQ-ACK information for the HARQ process transmitted PDSCH. When the offset value in timeline of a second HARQ process is larger than the predefined value, the UE determines not to report the second HARQ process in the one-shot HARQ-ACK feedback; and/or the one-shot HARQ-ACK codebook does not include HARQ-ACK information for the second HARQ process. In one implementation, the UE may receive a RRC message comprising the predefined value. In another implementation, the predefined value may be configured by a base station considering a data-processing speed/power of the UE.

In one implementation, the predefined threshold may be 4. When the offset value is larger than the threshold, and no new PDSCH is scheduled for this HARQ process, no ACK/NACK is reported for this HARQ process of one-shot HARQ-ACK codebook.

Figure 7:
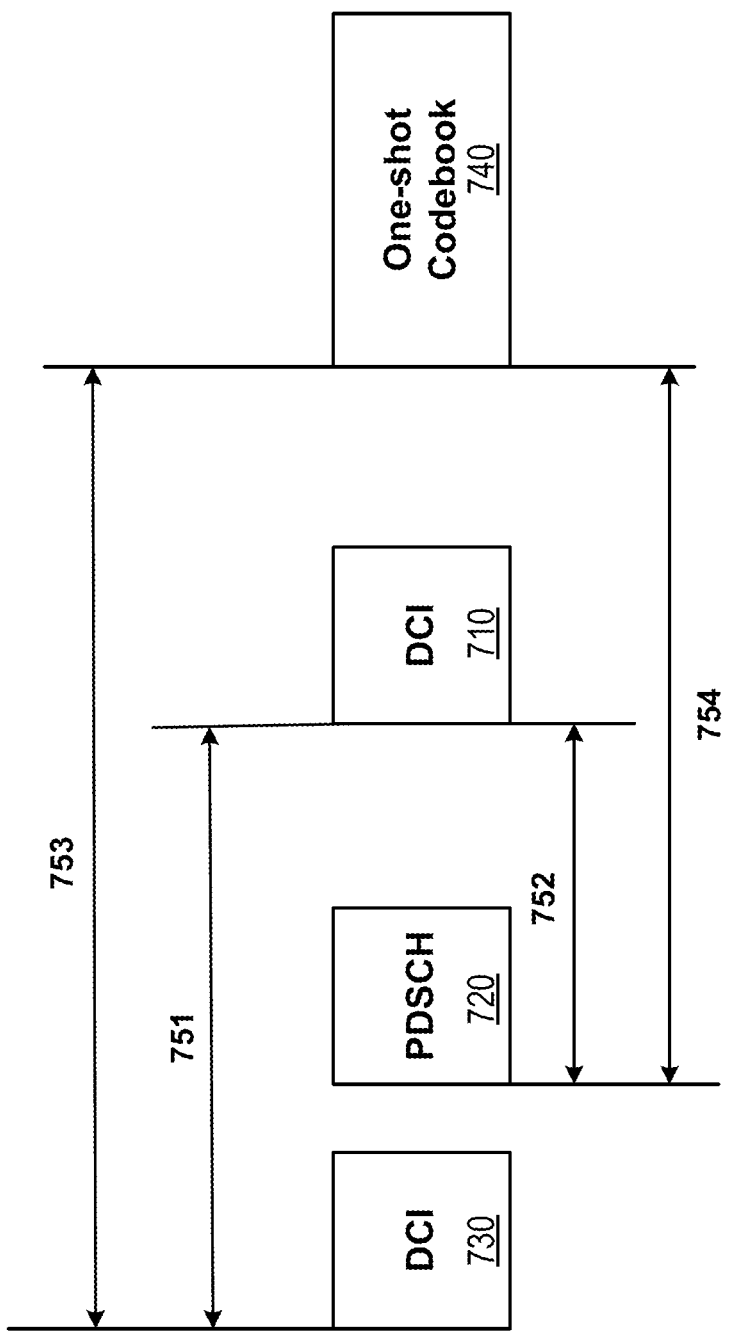
FIG. 7 shows a schematic diagram of a method for wireless communication.

The offset value in timeline may include various implementations, as shown in FIG. 7. The DCI 710 is a DCI triggering the one-shot HARQ-ACK codebook. The DCI 730 may be a second DCI scheduling the HARQ process. The PDSCH 720 may be a transmitted PDSCH corresponding to the HARQ process. The one-shot codebook 740 may be a one-shot HARQ-ACK codebook corresponding to the triggering DCI 710.

In one implementation, the offset value in timeline may be an offset value 751, which indicates a number of slot or sub-slot between the second DCI 730 scheduling the HARQ process and the DCI 710 triggering the one-shot HARQ-ACK codebook.

In another implementation, the offset value in timeline may be an offset value 752, which indicates a number of slot or sub-slot between the transmitted PDSCH 720 corresponding to the HARQ process and the DCI 710 triggering the one-shot HARQ-ACK codebook.

In another implementation, the offset value in timeline may be an offset value 753, which indicates a number of slot or sub-slot between the second DCI 730 scheduling the HARQ process and a slot transmitting the one-shot HARQ-ACK codebook 740.

In another implementation, the offset value in timeline may be an offset value 754, which indicates a number of slot or sub-slot between the transmitted PDSCH 720 corresponding to the HARQ process and the slot transmitting the one-shot HARQ-ACK codebook 740.

Figure 8:
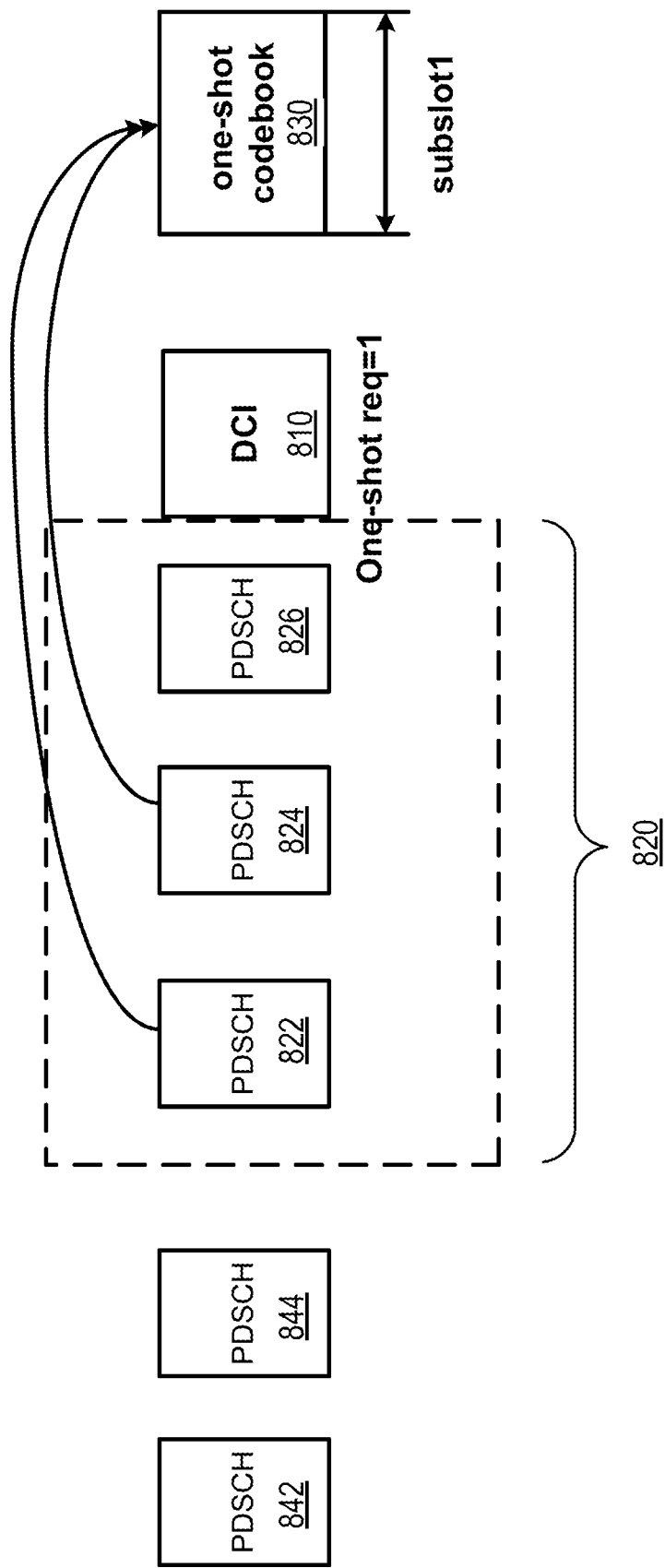
FIG. 8 shows a schematic diagram of a method for wireless communication.

In another embodiment, referring to FIG. 8, a UE may report the HARQ-ACK information for the PDSCH that transmitted in a time window 820 before a one-shot triggering DCI 810. The time window may be configured through RRC, for example but not limited to, 4 millisecond. In one implementation, when the UE has not obtain the ACK/NACK for the scheduled PDSCH that transmitted in the time window, the UE may report NACK. In another implementation, when the UE has not obtain the ACK/NACK for the scheduled PDSCH that transmitted in the time window, the UE may not report the HARQ-ACK information for this scheduled PDSCH.

In one implementation, the UE receives a RRC message including a size indicating a time window 820 with the size before the DCI 810 triggering the one-shot HARQ-ACK codebook. When a PDSCH (822, 824, and 826) corresponding to each of the at least one HARQ process being transmitted in the time window, the UE determines a one-shot HARQ-ACK codebook (830) according to the at least one HARQ process. The PDSCH may include a semi-persistent scheduling (SPS) PDSCH and/or DCI grant (DG) PDSCH. The one-shot HARQ-ACK codebook 830 comprises HARQ-ACK information for the at least one HARQ process to which a PDSCH (822, 824, and 826) is transmitted in the time window, and does not comprise HARQ-ACK information for other HARQ process to which a PDSCH (842 and 844) is transmitted outside the time window.

In another implementation, the last scheduled PDSCH (826) in the time window may have a short time process and the UE may have no time to obtain HARQ-ACK for this PDSCH (826). Under this circumstances, the UE may transmit NACK for any of the at least one HARQ process for which the UE has not obtain HARQ-ACK information. Alternatively, the UE may not transmit feedback information for any of the at least one HARQ process for which the UE has not obtain HARQ-ACK information.

In another implementation, instead of triggering all HARQ processes of each serving cell configured for the UE, a bit field may be added to the DCI that trigger one-shot HARQ-ACK feedback, and the bit field may indicate to the UE which HARQ processes are triggered for report HARQ-ACK. In one implementation, the DCI comprises a bit field. When at least one HARQ process is indicated by the bit field in the DCI, the UE determines the one-shot HARQ-ACK codebook according to the at least one HARQ process. The one-shot HARQ-ACK codebook comprises HARQ-ACK information for the at least one HARQ process indicated by the bit field in the DCI, and does not comprises HARQ-ACK information for other HARQ process not indicated by the bit field in the DCI.

The bit fields may include various implementations. In one implementation, the bit field comprises M bits, wherein M=A*B with A being a number of activated serving cells and B being a number of configured HARQ processes of each activated serving cell; and each bit of the bit filed indicates to perform one-shot HARQ-ACK feedback for each HARQ process of each activated serving cell. For example, the bit number of the bit field may have the relation with activated cell and configured HARQ process number of each activated cell. When the activated cell number is 4 and the configured HARQ process number of each activated cell is 6, 24 bits may serve as the bit field and be added in the DCI to indicate to the UE which HARQ process of each activated cell are request for HARQ-ACK report.

In another implementation, configured HARQ processes are divided into M groups of HARQ processes, and M is a positive integer. The bit field comprises M bits corresponding to the M groups of HARQ processes; and each bit of the bit filed indicates to perform one-shot HARQ-ACK feedback for each group of HARQ processes. For example, the configured HARQ processes are divided into 8 groups of HARQ processes, and the bit field includes 8 bits, each of which indicate whether to perform HARQ-ACK feedback for the corresponding group of HARQ processes.

In another implementation, configured HARQ processes are divided into M groups, and M is a positive integer. The bit field comprises ceil(log 2M) bits, and ceil ( ) is a ceiling function; and the bit field indicates to perform one-shot HARQ-ACK feedback for a (value of the bit field)th group of HARQ processes. For example, the configured HARQ processes are divided into 8 groups of HARQ processes, and the bit field includes 3 bits (=ceil(log 28)). The value of the bit field (for example, the bit field includes 110 with 6) indicates to the UE to perform HARQ-ACK feedback for the corresponding group (the 5th group) of HARQ processes.

In another implementation, configured HARQ processes are divided into two groups, one even group and one odd group. The even group includes even number HARQ processes and the odd group includes odd number HARQ processes. The bit field comprises one bit, indicating which group to perform HARQ-ACK feedback. For example, the bit field being 0 indicates to perform one-shot HARQ-ACK feedback for the odd group; and the bit field being 1 indicates to perform one-shot HARQ-ACK feedback for the even group.

In another embodiment, some explicit bits may be added in the DCI to tell the UE which HARQ process of which activated carrier are needed to report HARQ-ACK information. In this case, a base station may dynamically request the HARQ-ACK information according to its received results recently.

In one implementation, the DCI includes a group index. When the at least one HARQ process has a same group index as the group index in the DCI; the UE determines the one-shot HARQ-ACK codebook according to the at least one HARQ process. The one-shot HARQ-ACK codebook comprises HARQ-ACK information for the at least one HARQ process having the same group index as the group index in the DCI, and does not comprises HARQ-ACK information for other HARQ process having a different group index as the group index in the DCI. For example, when the PDSCH group index value is 1 of the DCI triggering one-shot HARQ-ACK codebook, all the PDSCH scheduled with the same PDSCH group index=1 may be needed to report HARQ-ACK in the one-shot HARQ-ACK codebook; and/or all the PDSCH scheduled with a different PDSCH group index=0 may not be needed to report HARQ-ACK in the one-shot HARQ-ACK codebook.

In another implementation, the DCI comprises a HARQ process number (HPN). When the at least one HARQ process having a HPN within an offset number of the HPN in the DCI; the UE determines the one-shot HARQ-ACK codebook according to the at least one HARQ process. The one-shot HARQ-ACK codebook comprises HARQ-ACK information for the at least one HARQ process having the HPN within the offset number of the HPN in the DCI, and does not comprises HARQ-ACK information for other HARQ process having the HPN outside the offset number of the HPN in the DCI. In one implementation, the UE receives a RRC message comprising the offset number, for example but not limited to, 1, 2, and 3. For example, the HARQ-ACK information of the subset HARQ processes that needed to report in the one-shot HARQ-ACK codebook is the HARQ processes number that is nearest to the HARQ process ID that indicated in the DCI triggering one-shot HARQ-ACK feedback. When the HARQ process number in the DCI triggering one-shot HARQ-ACK feedback is 6 and an offset number is 2, the UE may report the HARQ-ACK information of HPN=4, 5, 6, 7, 8 of all the activated cells.

In another embodiment, when a PDSCH is not scheduled of the DCI that trigger one-shot HARQ-ACK feedback, it is one-shot HARQ-ACK request field with value 1 in DCI Format 1_1 with DCI Format 1_1 CRC scrambled by CS-RNTI, use all '0' FDRA for resourceAllocationType0 and all '1' FDRA for resourceAllocationType 1 if resourceAllocation=dynamicSwitch is not provided, or use all "0" or all "1" FDRA if resourceAllocation=dynamicSwitch is provided. In one implementation, some bit fields related to scheduling PDSCH that are not used may be used to indicate which activated serving cells and which configured HARQ processes are needed to report HARQ-ACK information. As described in the present disclosure, one-shot feedback may be triggered more frequently and freely whenever needed and the one-shot HARQ-ACK codebook size may be controlled or reduced, improving the performance of the wireless system.

In one implementation, the DCI comprises a bit field and the DCI does not schedule PDSCH. When the at least one HARQ process is indicated by the bit field in the DCI; the UE determines the one-shot HARQ-ACK codebook according to the at least one HARQ process. The bit field comprises at least one of the following: a modulation and coding scheme of transport block 1 (MCS), a new data indicator of transport block 1 (NDI), a redundancy version of transport block 1 (RV), a HARQ process number (HPN), or at least one antenna port. For example, the base station may use at least one of the MCS, NDI, RV, HPN bit fields in the DCI that not scheduling PDSCH indicate to the UE to report the ACK/NACK information of a list of HARQ processes of a list of serving cells.

In various embodiments, referring to FIG. 9, a method 900 for wireless communication includes configuring hybrid automatic repeat request acknowledgement (HARQ-ACK) feedback for physical downlink shared channel (PDSCH) transmission. The method 900 may include a portion or all of the following: step 910, receiving, by a user equipment (UE), a radio resource control (RRC) parameter to configure a one-shot HARQ-ACK feedback mode; step 920, receiving, by the UE, a downlink control information (DCI) comprising an one-shot request field with a positive value, the DCI triggering a one-shot HARQ-ACK feedback; and step 930, transmitting, by the UE, a first one-shot HARQ-ACK feedback with a first one-shot HARQ-ACK codebook for at least one non-semi-persistent scheduling (non-SPS) PDSCH and a second one-shot HARQ-ACK feedback with a second one-shot HARQ-ACK codebook for at least one SPS PDSCH.

In one embodiment, a UE may receive the one-shot feedback request to trigger scheduled PDSCH and SPS PDSCH HARQ-ACK feedback. For the HARQ-ACK feedback for SPS PDSCH, a separate codebook may be constructed for transmitted SPS PDSCH. In one implementation, a first HARQ-ACK codebook for non-SPS/scheduled PDSCH and a second HARQ-ACK codebook for the SPS PDSCH may be transmit on different PUCCH/PUSCH. A value of K1 (PDSCH-to-HARQ_feedback timing indicator) is for the first HARQ-ACK codebook transmission for scheduled PDSCH in the DCI. In another implementation, the slot/sub-slot that transmitting the second HARQ-ACK codebook for SPS PDSCH is the nearest available uplink (UL) slot/sub-slot, such as the sub-slot next to the first HARQ-ACK codebook. In another implementation, the PUCCH resource indicator (PRI) of the PUCCH transmission carrying this HARQ-ACK codebook may be the same as indicated in the DCI triggered one-shot HARQ-ACK codebook.

Figure 10:
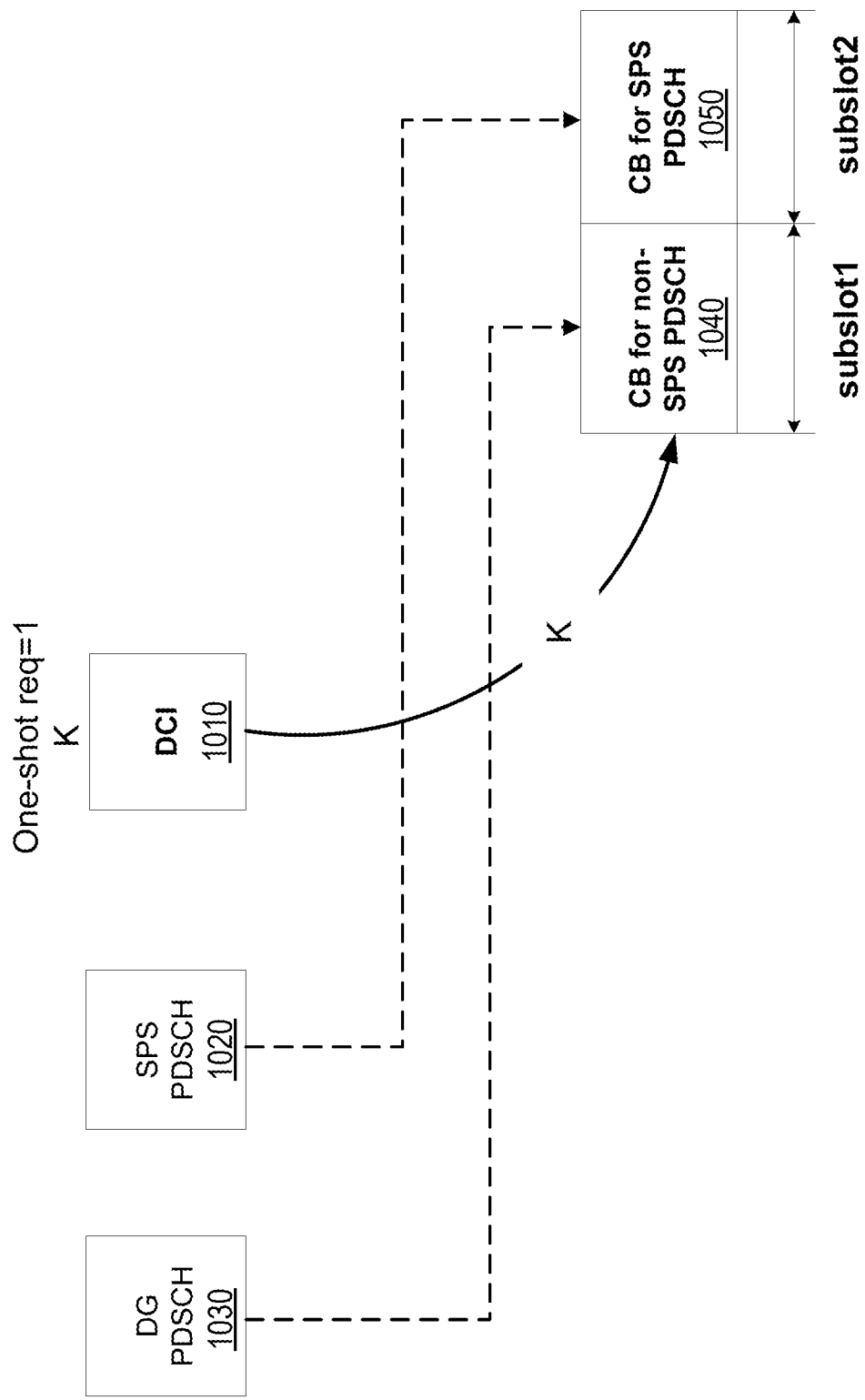
FIG. 10 shows a schematic diagram of a method for wireless communication.

In one implementation, the DCI comprises a K and the UE transmits the first one-shot HARQ-ACK codebook for the at least one non-SPS PDSCH in a slot or sub-slot at the K after PDSCH corresponding to the DCI. The UE transmits the second one-shot HARQ-ACK codebook for the at least one SPS PDSCH in a nearest available slot or sub-slot after the slot or sub-slot transmitting the first one-shot HARQ-ACK codebook. For example, referring to FIG. 10, after a UE receives a DCI 1010 that triggers one-shot request and includes K in sub-slot n, the UE sends a first HARQ-ACK codebook 1040 for scheduled PDSCH 1030 in sub-slot n+K on the PUCCH resource that indicates in the DCI and transmit a second HARQ-ACK codebook 1050 for SPS PDSCH 1020 in sub-slot n+K+1. In another implementation, when sub-slot n+K+1 is not available, such as the SFI indicates this sub-slot is used for DL transmission, the UE may send the second HARQ-ACK codebook 1050 for SPS PDSCH in sub-slot n+K+2 and so on.

In another implementation, a PUCCH resource indicator (PRI) of PUCCH transmission carrying the second one-shot HARQ-ACK codebook for the at least one SPS PDSCH is same as indicated in the DCI.

In another implementation, the second one-shot HARQ-ACK feedback for the at least one SPS PDSCH does not comprise new data indication (NDI) with a configured pdsch-HARQ-ACK-OneShotFeedbackNDI-r16. For example, for the HARQ process that transmitted SPS PDSCH, even if pdsch-HARQ-ACK-OneShotFeedbackNDI-r16 is configured, for SPS PDSCH feedback, the NDI may not be included in the one-shot HARQ-ACK feedback, which is different compared with some methods of padding bit 0 for each PDSCH HARQ process.

Some embodiments/implementations as described above may optionally include, in response to that the UE has previously transmitted HARQ-ACK information for a transport block (TB) t for a HARQ process number h on a serving cell c, and has not been scheduled for reception of another PDSCH corresponding to the TB t for the HARQ process number h on the serving cell c since the previous HARQ-ACK report, the UE does not report HARQ-ACK information for the HARQ process number h on the serving cell c in the one-shot HARQ-ACK codebook.

Some embodiments/implementations as described above may optionally include, when the UE has not yet obtained HARQ-ACK information for a transport block (TB) corresponding to a scheduled PDSCH reception, the UE may not report ACK/NACK information for this HARQ process number on a serving cell.

The present disclosure describes methods, apparatus, and computer-readable medium for wireless communication. The present disclosure addressed the issues with configuring hybrid automatic repeat request acknowledgement (HARQ-ACK) feedback for physical downlink shared channel (PDSCH) transmission. The methods, devices, and computer-readable medium described in the present disclosure may facilitate the performance of wireless communication by configuring HARQ-ACK feedback for PDSCH transmission, thus improving efficiency and overall performance. The methods, devices, and computer-readable medium described in the present disclosure may improves the overall efficiency of the wireless communication systems.

Reference throughout this specification to features, advantages, or similar language does not imply that all of the features and advantages that may be realized with the present solution should be or are included in any single implementation thereof. Rather, language referring to the features and advantages is understood to mean that a specific feature, advantage, or characteristic described in connection with an embodiment is included in at least one embodiment of the present solution. Thus, discussions of the features and advantages, and similar language, throughout the specification may, but do not necessarily, refer to the same embodiment.

Furthermore, the described features, advantages and characteristics of the present solution may be combined in any suitable manner in one or more embodiments. One of ordinary skill in the relevant art will recognize, in light of the description herein, that the present solution can be practiced without one or more of the specific features or advantages of a particular embodiment. In other instances, additional features and advantages may be recognized in certain embodiments that may not be present in all embodiments of the present solution.

The invention claimed is:

1. A method of configuring hybrid automatic repeat request acknowledgement (HARQ-ACK) feedback for physical downlink shared channel (PDSCH) transmission in wireless communication, the method comprising:
    receiving, by a user equipment (UE), a radio resource control (RRC) parameter to configure a one-shot HARQ-ACK feedback;
    receiving, by the UE, a medium access control (MAC) control element (CE) indicating a list of activated serving cells;
    receiving, by the UE, a downlink control information (DCI) comprising a one-shot request field with a positive value, wherein the DCI triggers a one-shot HARQ-ACK codebook determined by the UE according to the list of activated serving cells indicated by the MAC CE; and
    transmitting, by the UE, a one-shot HARQ-ACK feedback for the list of activated serving cells,
    wherein, in response to that the UE has previously transmitted HARQ-ACK information for a transport block (TB) t for a HARQ process number h on a serving cell c, and has not been scheduled for reception of another PDSCH corresponding to the TB t for the HARQ process number h on the serving cell c since a previous HARQ-ACK report, the UE does not report HARQ-ACK information for the HARQ process number h on the serving cell c in the one-shot HARQ-ACK codebook.

2. The method according to claim 1, wherein:
the one-shot request field with a positive value comprises the one-shot request field with a value of 1; and
the RRC parameter to configure the one-shot HARQ-ACK feedback comprises a pdsch-HARQ-ACK-Codebook with pdsch-HARQ-ACK-OneShotFeedback-r16 enabled.

3. A method of configuring hybrid automatic repeat request acknowledgement (HARQ-ACK) feedback for physical downlink shared channel (PDSCH) transmission in wireless communication, the method comprising:
receiving, by a user equipment (UE), a radio resource control (RRC) parameter to configure a one-shot HARQ-ACK feedback;
receiving, by the UE, a downlink control information (DCI) comprising a one-shot request field with a positive value, the DCI triggering a one-shot HARQ-ACK codebook; and
in response to at least one HARQ process satisfying a preset condition, transmitting, by the UE, a one-shot HARQ-ACK codebook determined according to the at least one HARQ process,
wherein the at least one HARQ process satisfying the preset condition comprises: in response to the DCI comprises a bit field associated with the one-shot HARQ-ACK feedback, the bit field comprises a group index indicating one of M HARQ process groups as the at least one HARQ process, M being a positive integer, and wherein HARQ processes are divided into the M HARQ process groups, and wherein the bit field comprises ceil ($\log_2$ M) bits, ceil ( ) being a ceiling function.

4. The method according to claim 3, wherein:
the one-shot request field with a positive value comprises the one-shot request field with a value of 1; and
the RRC parameter indicating the one-shot HARQ-ACK feedback mode-comprises a pdsch-HARQ-ACK-Codebook with pdsch-HARQ-ACK-OneShotFeedback-r16 enabled.

5. The method according to claim 3, wherein:
the DCI comprises a priority index; and
the at least one HARQ process satisfying the preset condition comprises the at least one HARQ process having a same priority index as the priority index in the DCI.

6. The method according to claim 3, wherein:
each of the at least one HARQ process comprises an offset value in timeline, the offset value being no larger than a predefined value; and
the at least one HARQ process satisfying the preset condition comprises the offset value in timeline of each of the at least one HARQ process being no larger than a predefined value.

7. The method according to claim 3, wherein:
the UE receives an RRC message comprising a size indication indicating a size of a time window before the DCI triggering the one-shot HARQ-ACK codebook; and
the at least one HARQ process satisfying the preset condition further comprises that a PDSCH corresponding to each of the at least one HARQ process is being transmitted in the time window.

8. The method of claim 3, wherein:
the DCI does not schedule PDSCH; and
a modulation and coding scheme in the DCI is used as the bit field associated with the one-shot HARQ-ACK feedback.

9. A method for wireless communication, comprising:
configuring hybrid automatic repeat request acknowledgement (HARQ-ACK) feedback for physical downlink shared channel (PDSCH) transmission by:
receiving, by a user equipment (UE), a radio resource control (RRC) parameter to configure a one-shot HARQ-ACK feedback;
receiving, by the UE, a downlink control information (DCI) comprising a one-shot request field with a positive value, the DCI triggering a one-shot HARQ-ACK feedback; and
transmitting, by the UE, a first one-shot HARQ-ACK feedback with a first one-shot HARQ-ACK codebook for at least one non-semi-persistent scheduling (non-SPS) PDSCH and a second one-shot HARQ-ACK feedback with a second one-shot HARQ-ACK codebook for at least one SPS PDSCH.

10. The method according to claim 9, wherein:
the DCI comprises a value of K; and
the UE transmits the first one-shot HARQ-ACK codebook for the at least one non-SPS PDSCH in a slot or subslot at K slots or subslots after PDSCH corresponding to the DCI.

11. The method according to claim 9, wherein:
a PUCCH resource indicator (PRI) of PUCCH transmission carrying the second one-shot HARQ-ACK codebook for the at least one SPS PDSCH is same as indicated in the DCI.

12. The method according to claim 9, wherein:
the second one-shot HARQ-ACK feedback for the at least one SPS PDSCH does not comprise new data indication (NDI) with a configured pdsch-HARQ-ACK-OneShotFeedbackNDI-r16.

13. An apparatus comprising:
a memory storing instructions; and
a processor in communication with the memory, wherein, when the processor executes the instructions, the processor is configured to cause the apparatus to perform the method according to claim 1.

14. An apparatus comprising:
a memory storing instructions; and
a processor in communication with the memory, wherein, when the processor executes the instructions, the processor is configured to cause the apparatus to perform the method according to claim 3.

15. An apparatus comprising:
a memory storing instructions; and
a processor in communication with the memory, wherein, when the processor executes the instructions, the processor is configured to cause the apparatus to perform the method according to claim 9.

16. A method of configuring hybrid automatic repeat request acknowledgement (HARQ-ACK) feedback for physical downlink shared channel (PDSCH) transmission in wireless communication, the method comprising:
transmitting, by a base station to a user equipment (UE), a radio resource control (RRC) parameter to configure a one-shot HARQ-ACK feedback;
transmitting, by the base station to the UE, a downlink control information (DCI) comprising a one-shot request field with a positive value, the DCI triggering a one-shot HARQ-ACK codebook; and
receiving, by the base station, a one-shot HARQ-ACK codebook determined according to at least one HARQ process from the UE in response to the at least one HARQ process satisfying a preset condition, wherein the at least one HARQ process satisfying the preset condition comprises: in response to the DCI comprises a bit field associated with the one-shot HARQ-ACK feedback, the bit field comprises a group index indicating one of M HARQ process groups as the at least one HARQ process, M being a positive integer, and wherein HARQ processes are divided into the M HARQ process groups, and wherein the bit field comprises ceil ($\log_2$ M) bits, ceil ( ) being a ceiling function.

17. The method of claim 16, wherein:

the DCI does not schedule PDSCH; and a modulation and coding scheme in the DCI is used as the bit field associated with the one-shot HARQ-ACK feedback.

* * * * *